(12) United States Patent
Chen

(10) Patent No.: US 12,740,664 B2
(45) Date of Patent: Sep. 22, 2026

(54) CONTAINER CAPABLE OF DISPLAYING INFORMATION

(71) Applicant: Kuan Ming Chen, Tainan City (TW)

(72) Inventor: Kuan Ming Chen, Tainan City (TW)

( * ) Notice: Subject to any disclaimer, the term of this patent is extended or adjusted under 35 U.S.C. 154(b) by 213 days.

(21) Appl. No.: 18/656,877

(22) Filed: May 7, 2024

(65) Prior Publication Data

US 2024/0374076 A1 Nov. 14, 2024

(30) Foreign Application Priority Data

May 11, 2023 (TW) ................................ 112117436

(51) Int. Cl.
*A47J 31/41* (2006.01)
*G01F 11/26* (2006.01)
*G01F 15/06* (2022.01)

(52) U.S. Cl.
CPC ............ *A47J 31/41* (2013.01); *G01F 11/262* (2013.01); *G01F 15/068* (2013.01)

(58) Field of Classification Search
CPC ........................... B67D 3/0077; B67D 3/0051
USPC .......................................................... 222/173
See application file for complete search history.

(56) References Cited

U.S. PATENT DOCUMENTS

D796,888 S * 9/2017 Miller ........................... D7/312
10,684,630 B1 * 6/2020 Ciarlante ............... B65D 77/28
10,687,651 B2 * 6/2020 Miller .................... G05D 23/22
2014/0346198 A1 * 11/2014 Bond .................. B67D 3/0041 222/641
2016/0135626 A1 * 5/2016 Pfeiffer ............. B65D 51/1644 206/459.1
2018/0160847 A1 * 6/2018 Miller .................... G05D 23/22
2021/0403310 A1 * 12/2021 Lindberg ............ B67D 3/0041

FOREIGN PATENT DOCUMENTS

CN 105243286 1/2016
CN 105387907 3/2016
CN 107427140 12/2017
CN 107576365 1/2018
CN 107576365 A * 1/2018
CN 111084548 5/2020
CN 111084548 A * 5/2020 ........ A47J 27/21008
CN 212779516 3/2021
CN 113387028 9/2021
JP 2000316721 11/2000
TW M622747 2/2022
WO 2018122173 7/2018

OTHER PUBLICATIONS

Machine translation of CN-107576365-A.*
Machine Translation of CN-111084548-A.*

* cited by examiner

*Primary Examiner* — Jeremy Carroll
(74) *Attorney, Agent, or Firm* — BACON & THOMAS, PLLC

(57) ABSTRACT

A container capable of displaying information includes a container body and a display mounted on the container body, an attitude sensor, and a control circuit module. The control circuit module is signally connected to the display and the attitude sensor. The control circuit module computes an information based on the measurement value of the attitude sensor and controls the display to show the information.

13 Claims, 13 Drawing Sheets

13
20
14
15

10
11
12
13
14
15
30
40
50
72
720
S1
S2
D
Yaw
Pitch
Roll

CONTAINER CAPABLE OF DISPLAYING INFORMATION

CROSS REFERENCE TO RELATED APPLICATION(S)

This application claims the priority to patent application No. 112117436 filed in Taiwan on May 11, 2023, which is hereby incorporated in its entirety by reference into the present application.

BACKGROUND OF THE INVENTION

1. Field of the Invention

The present invention relates to a container, in particular to a container capable of displaying information.

2. Description of the Related Art

Containers can be used to hold liquids and to transfer the liquids therein to other places or objects; for example, a water pitcher is one of the common containers for containing water, and the water in it can be poured out into a cup.

Taking the scene of coffee brewing as an example, a consumer nowadays mainly places a coffee pot on a digital scale, and the top side of the coffee pot is equipped with filter papers and coffee powder. The consumer can take a gooseneck kettle over the top of the coffee pot and pour water onto the filter paper to brew the coffee powder, and find out a volume of water discharged from the gooseneck kettle through the weight data shown by the digital scale. The uniqueness of hand-drip coffee lies in the fact that the flavor of hand-drip coffee is closely related to the consumer's hand-drip skills. During the dripping and brewing process, the consumer can control the volume of water discharged from the gooseneck kettle according to the characteristics of the coffee beans and the coarseness of the powdered coffee particles, and carefully observes subtle changes in the volume of water discharged from the gooseneck kettle.

However, for a consumer, he/she needs to pay close attention to the changes in the flow of water from the spout of the gooseneck kettle on one hand, and to observe the weight data on the digital scale on the other hand. As a height difference exists between the spout of the gooseneck kettle and the digital scale, the consumer is distracted from alternatingly and repeatedly observing the above two information, which makes it difficult to grasp the coffee brewing status, especially for a beginner.

SUMMARY OF THE INVENTION

In view of the above-mentioned, the main purpose of the present invention is to provide a container capable of displaying information to overcome the difficulties for a consumer to control the volume of water discharged from the conventional gooseneck kettle.

The container capable of displaying information of the present invention, includes:

a container body;

a display, mounted on the container body;

an attitude sensor, mounted in the container body; and a control circuit module, mounted in the container body and signally connected to the display and the attitude sensor, wherein the control circuit module computes an information based on measurement values from the attitude sensor and controls the display to show the information.

The liquid contained in the container of the present invention is water as an example. When a user lifts up the container of the present invention to pour out water, the measurement values of the attitude sensor correspond to inclination angles of the container body, and the inclination angles can reflect a pouring angle and a water flow rate. As a result, the control circuit module can compute the information based on the measurement values of the attitude sensor. For example, the information may be a discharged cumulative amount of water, and then the control circuit module controls the display to show the information. Therefore, under the scenario of hand-drip coffee, when the user lifts up the container of the present invention to pour water out, the user can directly observe the information shown on the display of the container of the present invention to know how much water has been discharged, and the user can avoid distractions from alternatively observing the changes of the flow of water at the spout of the gooseneck kettle and the weight data of the electronic scale at the bottom of the container, as described in the prior art. The container of the present invention makes it easier and more convenient for the user to control the volume of water contained in the container, the flow rate, and other factors, and thereby good quality hand-drip coffee can be realized.

In order to make the above objects, features and advantages of the present invention more apparent and easier to understand, the following embodiments, together with the accompanying drawings, are described in detail as follows.

DETAILED DESCRIPTION OF THE INVENTION

The technical solution of the present invention is further described below in conjunction with the accompanying drawings and by means of specific embodiments. In the description of the present invention, it is to be understood that the terms "center", "longitudinal", "lateral", "length", "width", "thickness", "top", "bottom", "left", "right", "vertical", "horizontal", "top", "bottom", "inner", "outer", "axial", "radial", "circumferential" and the like indicate orientation or positional relationships based on those shown in the accompanying drawings, and are intended only to facilitate the description of the present invention and to simplify the description, and are not intended to indicate or imply that the device or element referred to must have a particular orientation, or be constructed and operated in a particular orientation and therefore cannot be construed as limitations of the present invention.

Furthermore, the terms "first" and "second" are used for descriptive purposes only and are not to be understood as indicating or implying relative importance or implicitly specifying the number of technical features indicated. Thus, the feature defined with "first", "second" may include one or more such features, either explicitly or implicitly. In the description of the present invention, unless otherwise specified, "more than one" means two or more.

In the description of the present invention, it is to be noted that, unless otherwise expressly specified and limited, the terms "mounted", "connected", and "connecting" are to be understood in a broad sense. For example, it may be a fixed connection, a removable connection, or a connection in one piece; it may be a direct connection, an indirect connection through an intermediate medium, or a connection within two elements. For a person of ordinary skill in the art, the specific meaning of the above terms in the present invention may be understood in a specific context.

Figure 1:
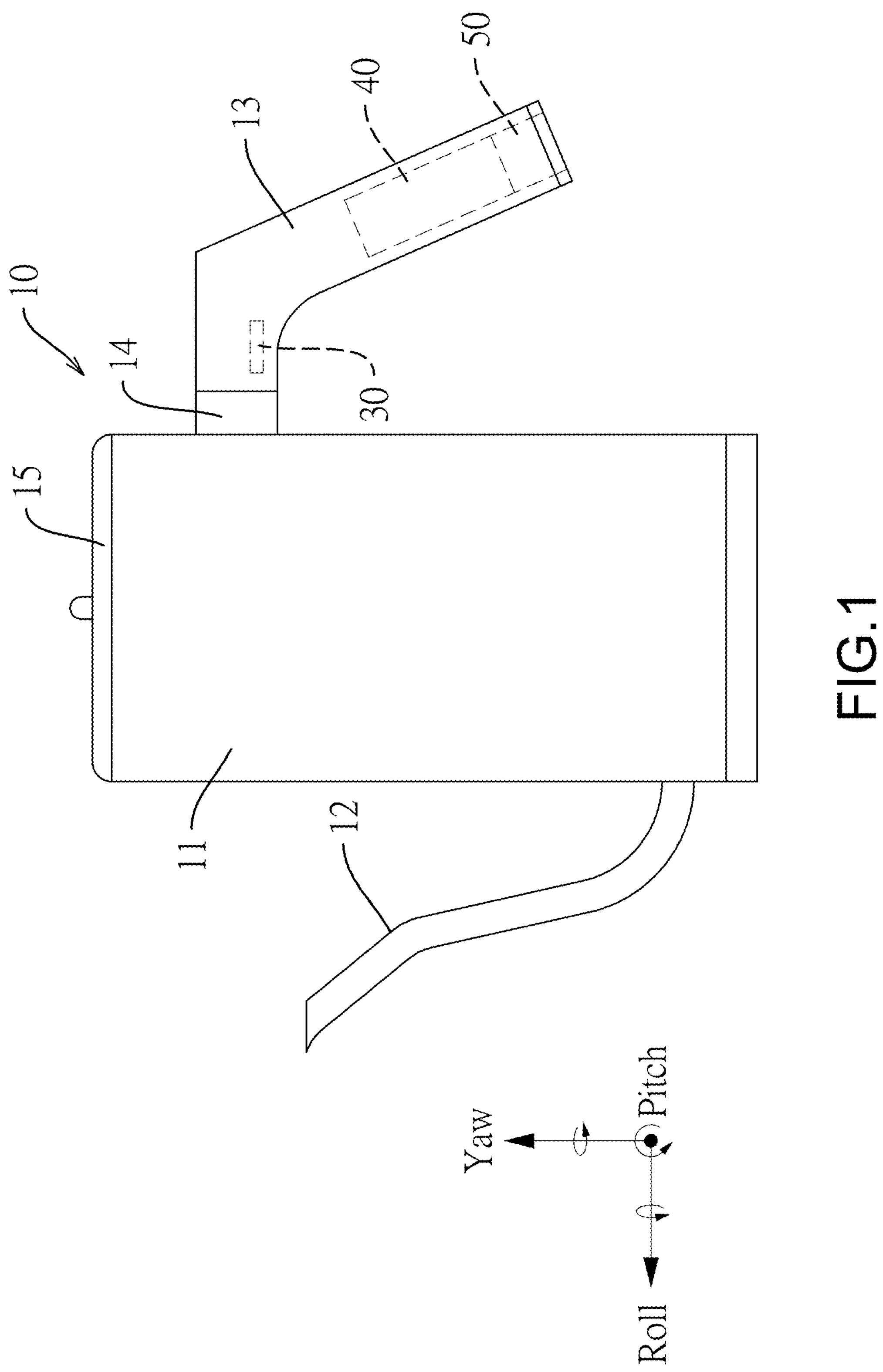
FIG. 1 is a side plane view of the container capable of displaying information of the present invention.
Figure 2:
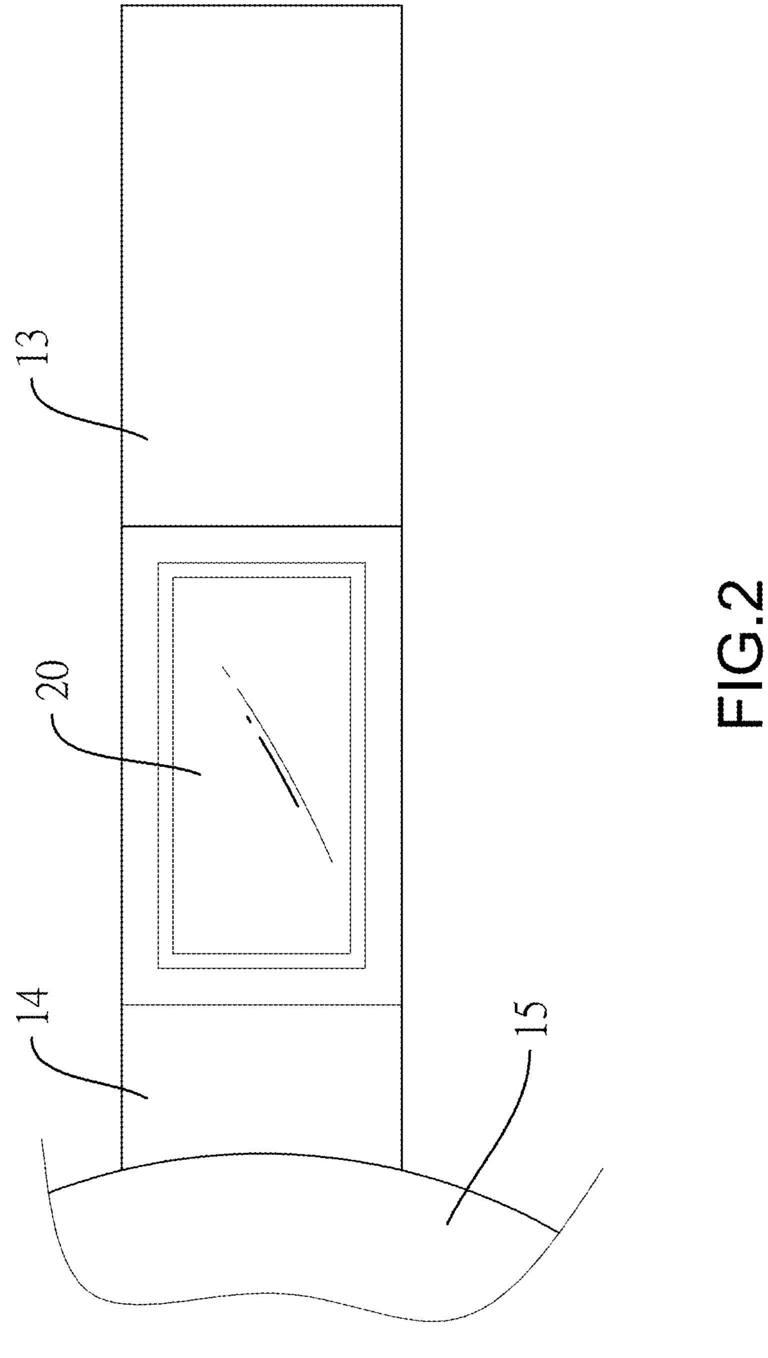
FIG. 2 is a partial top plan view of the container capable of displaying information of the present invention.

Referring to FIGS. 1 and 2: an embodiment of the container capable of displaying information of the present invention comprises a container body 10, a display 20, an attitude sensor 30, and a control circuit module 40.

The container body 10 comprises a body portion 11 which can contain liquid food or liquid non-food. For example, the body portion 11 can be a jug, bottle, jar, cup, bowl, pot, basin, or bucket. For example, said liquid food can be water, oil, tea, wine, coffee, milk, juice, soup, or seasonings (e.g., soy sauce, vinegar, etc.). For example, said liquid non-food may be alcohol, chemical solutions, etc. For example, the body portion 11 may be made of stainless steel, ceramic, plastic, or glass. The container body 10 may comprise a flow-guiding portion 12, which is mounted on a side wall of the body portion 11 for pouring liquid out. For example, the flow-guiding portion 12 may be a tube, an opening, or a groove. The container body 10 may comprise a grip portion 13, which may be a handle mounted on the side wall of the body portion 11 for the user to hold. Referring to the embodiment shown in FIG. 1: the body portion 11 is a pot, and the flow-guiding portion 12 is a gooseneck spout mounted opposite to the grip portion 13. A ring 14 may be mounted between the body portion 11 and the grip portion 13, and for example, the ring 14 may be a fireproof ring. A lid 15 (such as a cap of a gooseneck kettle) is mounted on the top side of the body portion 11.

The display 20 is mounted on the container body 10 to provide a function of information display. The display 20 can be, for example, a flexible display, a liquid crystal display, seven-segment light-emitting diode displays or other types of displays. For example, the display 20 can be mounted on the body portion 11 or the grip portion 13 of the container body 10. In one embodiment shown in FIG. 2, the display 20 is mounted on a top side of the grip portion 13.

The attitude sensor 30 is mounted in the container body 10. For example, the attitude sensor 30 can be mounted in the body portion 11 or the grip portion 13 of the container body 10. For example, the attitude sensor 30 can be an angle sensor, and the angle sensor can be a commercially available inductive-type, potentiometer-type, or optical-type angle sensor. The embodiment of the present invention takes an inductive-type angle sensor as an example, which may be a gyroscope chip, but is not limited thereto. As shown in FIG. 1, the grip portion 13 has an accommodating space inside, and the attitude sensor 30 can be placed horizontally in the accommodating space of the grip portion 13. In another feasible embodiment, the attitude sensor 30 can also be placed horizontally in a sandwiched compartment at the bottom side of the body portion 11. A battery can be mounted in the sandwiched compartment to power the attitude sensor 30.

The working principle of the gyroscope chip is common knowledge in related technical fields. In short, the attitude sensor 30 can at least output a first voltage signal, a second voltage signal, and a third voltage signal. Please refer to FIG. 1: the first voltage signal corresponds to an angular velocity of a first sensing axis (Pitch), the second voltage signal corresponds to an angular velocity of a second sensing axis (Roll), and the third voltage signal corresponds to an angular velocity of a third sensing axis (Yaw). The foregoing voltage signals can reflect the attitude of the container body 10. When the container body 10 is placed horizontally, the first sensing axis (Pitch) and the second sensing axis (Roll) form a horizontal plane, and the third sensing axis (Yaw) is vertical to the horizontal plane. It can be understood that each voltage signal can correspond to an angular velocity measurement value after being sampled and converted by an analog-to-digital converter. The unit of the angular velocity measurement value is degree-per-second (dps). Please refer to FIG. 3: in the present invention, the angular velocity measurement value corresponding to the first voltage signal can be integrated over time to obtain an angle value $\theta$, which is an inclination angle of the container body 10 relative to the horizontal plane.

The control circuit module 40 is mounted in the container body 10. For example, the control circuit module 40 can be mounted in the body portion 11 or the grip portion 13 of the container body 10. Please refer to the embodiment shown in FIG. 1: the grip portion 13 can include a tubular body. The control circuit module 40 is mounted inside the tubular body. In addition, a power unit 50 can be mounted in the accommodation space of the grip portion 13. The power unit 50 is electrically connected to the control circuit module 40 to provide a working power. The control circuit module 40 can also control the display 20 to show a battery level of the power unit 50.

Figure 4:
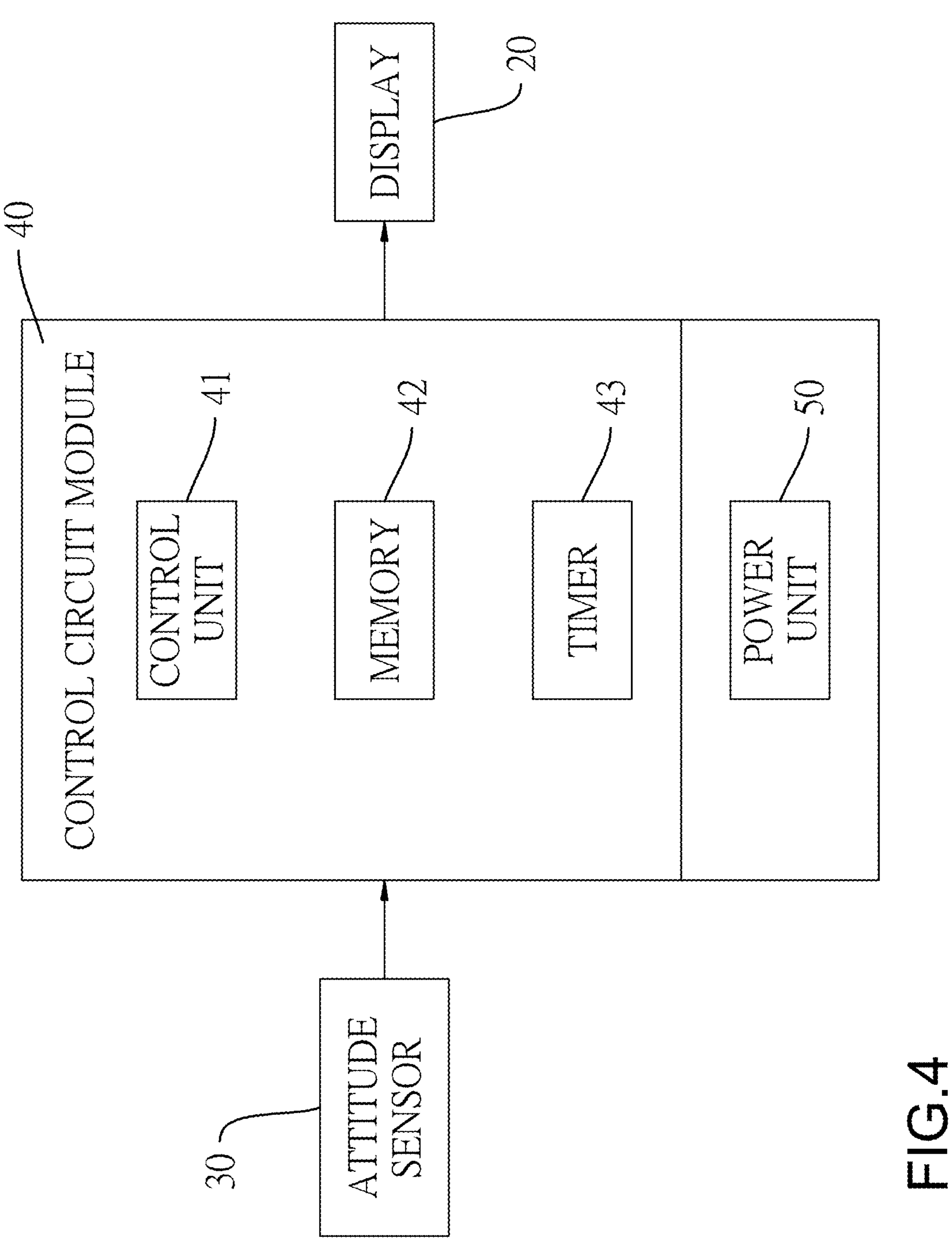
FIG. 4 is a circuit block diagram of the container capable of displaying information of the present invention.

The control circuit module 40 mainly provides data computation and control functions. For example, the control circuit module 40 can be a micro controller unit circuit module (MCU circuit module). Please refer to FIG. 4: the control circuit module 40 can include a control unit 41, a memory 42, a timer 43, input/output (I/O) interfaces, etc., but is not limited thereto. Among them, the control unit 41 can be a microcontroller chip, and the timer 43 can be implemented by a clock function of the control unit 41. The control circuit module 40 is signally connected to the display 20 and the attitude sensor 30, and performs computations based on the measurement values of the attitude sensor 30 so as to control the display 20 to show the information.

In the aforementioned, the term "signally connected connection structure" refers to a connection structure, such as a wired connection or a wireless connection, in which the control circuit module 40 can receive the measurement values output by the attitude sensor 30 and can output control signals to control the display 20. For example, in the embodiment shown in FIG. 1: the control circuit module 40, the display 20, and the attitude sensor 30 are mounted in the grip portion 13. The control circuit module 40 can be connected to the display 20 and the attitude sensor 30 through substantial wires, so that the control circuit module 40 can receive the measurement values from the attitude sensor 30 and computes the angle value. The foregoing "signally connected connection structure" can be implemented by wireless communication modules such as Bluetooth circuit modules.

The following examples describe the working principle of the control circuit module 40.

1. Initial Value

An initial value refers to a volume of liquid contained in the body portion 11 before pouring out the liquid from the container of the present invention each time. In one embodiment, the initial value can be a preset value. For example, the initial value can be preset to 300 ml (milliliter). Then, each time, before pouring out liquid from the container of the present invention, the user has to fill 300 ml of liquid in the body portion 11 at first. Likewise, when the initial value is preset to 250 ml, the user has to fill 250 ml of liquid in the body portion 11. And then the user pours out the liquid. In another embodiment, the initial value may be a measured value, which is described later.

2. The Data Pre-Stored in the Memory 42 of the Control Circuit Module 40

The memory 42 of the control circuit module 40 stores a look-up table. The look-up table can include multiple reference liquid volume values and for each one of the reference liquid volume values, the comparison table stores multiple liquid-discharge reference values and multiple different inclination angles respectively corresponding to the liquid-discharge reference values, and wherein the liquid-discharge reference value is an immediate flow rate. For better understanding, for example, the reference liquid volume values of the look-up table can include 300 ml and 250 ml, the inclination angles corresponding to 300 ml reference liquid volume can include 10 degrees and 15 degrees, and the liquid-discharge reference value corresponding to 10 degrees inclination angle can be 2 ml/s (ml/second), and the liquid-discharge reference value corresponding to 15 degrees inclination angle can be 2.2 ml/s. The inclination angles corresponding to 250 ml can include 25 degrees and 30 degrees, and the liquid-discharge reference value corresponding to 25 degrees inclination angle can be 2 ml/s, the liquid-discharge reference value corresponding to 30 degrees inclination angle can be 2.2 ml/s. Regarding the establishment of the look-up table, the user can fill the body portion 11 with 300 ml of liquid at first, then the user pours the liquid into a measuring cup and meanwhile observes and records the inclination angle values θ corresponding to the first voltage signal output by the attitude sensor 30. Then the liquid-discharge reference values and corresponding inclination angles for the body portion 11 containing 300 ml of liquid can be obtained. The look-up table of other reference liquid volume values, inclination angles, and liquid-discharge reference values can be deduced accordingly.

In addition to the foregoing embodiment of the look-up table, in another embodiment, the memory 42 of the control circuit module 40 can store multiple reference liquid volume values and multiple functional equations respectively corresponding to the reference liquid volume values. The input of the functional equation is the inclination angle, and the output of the functional equation is the liquid-discharge reference value, wherein the functional equation can be derived based on the data in the foregoing look-up table. For example, the functional equation can be a linear or a nonlinear functional equation. For better understanding, taking the linear functional equation as an example, the linear functional equation can be expressed as: $y=ax+b$, where y is the liquid-discharge reference value, x is the inclination angle, and a and b are constants.

3. Immediate Inclination Angle

Figure 3:
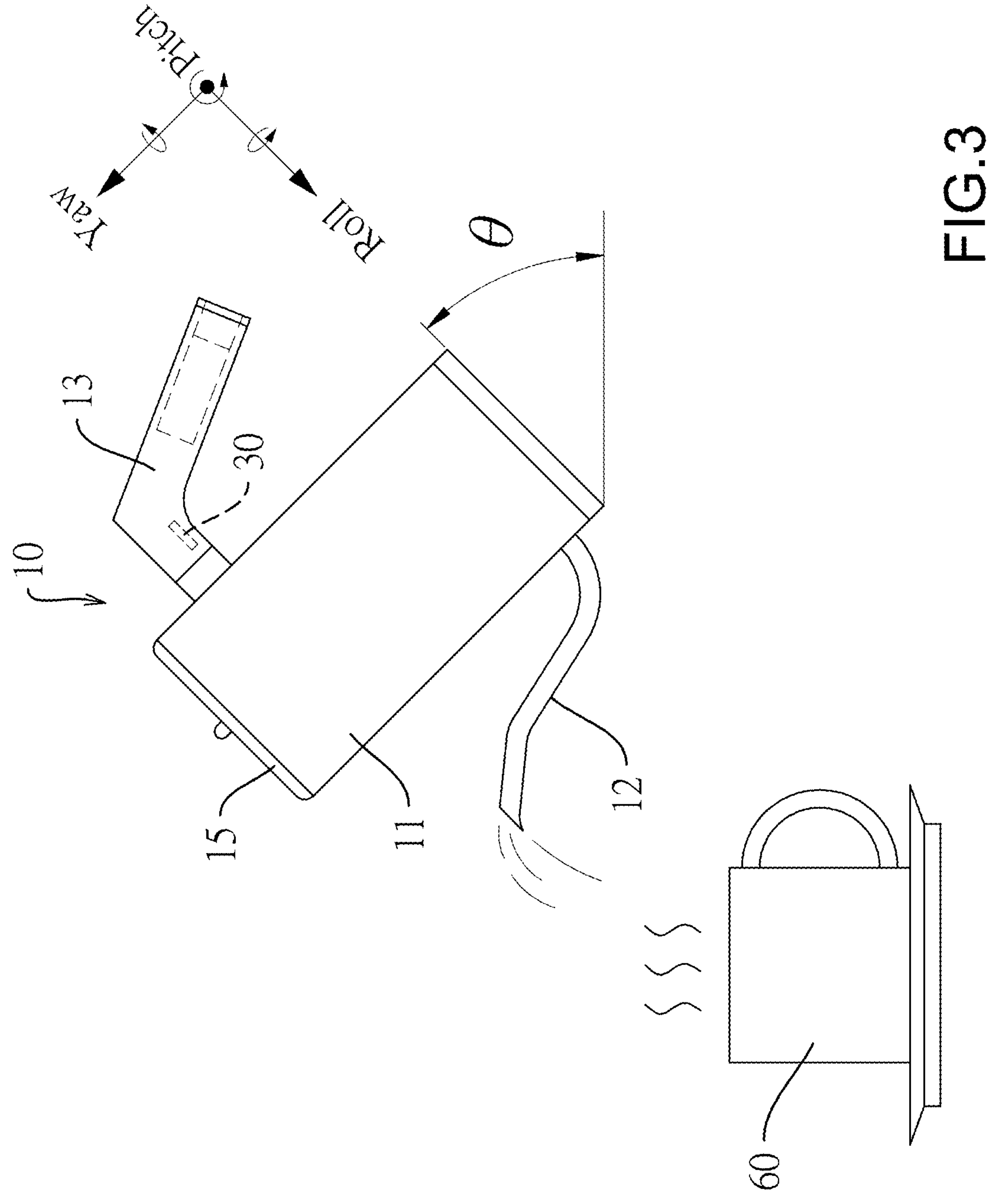
FIG. 3 is a schematic view of the container capable of displaying information of the present invention pouring out water.

Please refer to FIG. 3: the user can pour out the liquid in the container of the present invention into a cup 60. Since the first voltage signal output by the attitude sensor 30 corresponds to the angular velocity of the first sensing axis (Pitch), the control unit 41 can integrate the angular velocity measurement value of the first voltage signal over time to obtain an angle value θ, and the angle value θ is the immediate inclination angle of the container body 10 relative to the horizontal plane.

4. Computation of Liquid-Discharge Value

During a water pouring process, the control unit 41 obtains a liquid-discharge reference value through the look-up table or the functional equation according to the initial value and the immediate inclination angle, wherein the control unit 41 can find a corresponding liquid-discharge reference value based on both the initial value and the immediate inclination angle in the look-up table. For example, when the initial value is 300 ml and the immediate inclination angle is 10 degrees, the control unit 41 can find a corresponding liquid-discharge reference value of 2 ml/s in the look-up table. It is also understandable that when the initial value and immediate inclination angle do not match the reference liquid volume values and the inclination angles in the look-up table, the control unit 41 may obtain the liquid-discharge reference value by means of interpolation. The operation of the interpolation is a common knowledge in the related technical field. Alternatively, in another embodiment, the control unit 41 may find a corresponding functional equation for the reference-liquid volume value based on the initial value, and then the immediate inclination angle is input to the functional equation to obtain the liquid-discharge reference value.

The control unit 41 can perform an integration operation to the liquid-discharge reference value over time to obtain a first liquid-discharge volume. For example, the control unit 41 obtains a liquid-discharge reference value Y1 at time of t1, and the first liquid-discharge volume can be expressed as follows:

$$\text{the first liquid}-\text{discharge volume} = \int_{t1}^{tx} Y1dt$$

In the above equation, after t1, tx is the time when a next liquid-discharge reference value is obtained. Then, the control unit 41 may subtract the first liquid-discharge volume from the initial value to obtain an immediate liquid volume. The immediate liquid volume corresponds to the amount of water currently stored in the body portion 11. For example, when the initial value is 300 ml and the first liquid-discharge volume is 10 ml, the immediate liquid volume is 290 ml.

By analogy, the control unit 41 obtains another liquid-discharge reference value based on the immediate liquid volume and the immediate inclination angle through the look-up table or the functional equation. And the control unit 41 integrates said another liquid-discharge reference value over time to obtain another liquid-discharge volume (hereinafter referred to as a second liquid-discharge volume) which is 12 ml for example. The control unit 41 can update the immediate liquid volume by subtracting the second liquid-discharge volume from the current immediate liquid volume. And the updated immediate liquid volume is 278 ml for example. Further, the control unit 41 obtains the other liquid-discharge reference value through the look-up table or the functional equation based on the immediate inclination angle and the current immediate liquid volume which is the foregoing 278 ml. And the control unit 41 integrates said the other liquid-discharge reference value over time to obtain the other liquid-discharge volume (hereinafter referred to as a new second liquid-discharge volume) which is 13 ml for example. The control unit 41 can again update the immediate liquid volume by subtracting said new second liquid-discharge volume (13 ml) from the current immediate liquid volume (278 ml). And the updated immediate liquid volume is 265 ml for example. Similarly, during the pouring process, as the water amount in the body portion 11 becomes less and less, the immediate liquid volume is also updated accordingly. And the control unit 41 obtains a plurality of liquid-discharge reference values through the look-up table or the functional equations based on the continuously updated immediate liquid volumes and the immediate inclination angles, and then the control unit 41 performs integration over time to correspondingly obtain a plurality of the second liquid-discharge volumes.

5. Computation and Display of Cumulative Liquid-Discharge Volume

The control unit 41 may drive the display 20 to show information. For example, the information may be, but is not limited to, a cumulative liquid-discharge volume. The cumulative liquid-discharge volume is a cumulated value of the first liquid-discharge volume and those second liquid-discharge volumes during the pouring process. For example, when the control unit 41 computes the first liquid-discharge volume of 10 ml at a first time, the control unit 41 may control the display 20 to display the cumulative liquid-discharge volume of 10 ml. When the control unit 41 computes a second liquid-discharge volume of 12 ml at a subsequent second time, the control unit 41 computes the 10 ml plus the 12 ml to get 22 ml and controls the display 20 to display a cumulative liquid-discharge volume of 22 ml. When the control unit 41 computes another second liquid-discharge volume of 13 ml at a subsequent third time, the control unit 41 computes the foregoing 22 ml plus the 13 ml to get 35 ml and controls the display 20 to show the cumulative liquid-discharge volume of 35 ml, and so on. Therefore, the user can check the cumulative liquid-discharge volume displayed by the display 20, and the cumulative liquid-discharge volume serves as an objective reference information for the user to effectively keep track of the liquid-discharge volume status. The display 20 may show the cumulative liquid-discharge volume in a number format or a pattern format.

Figure 5:
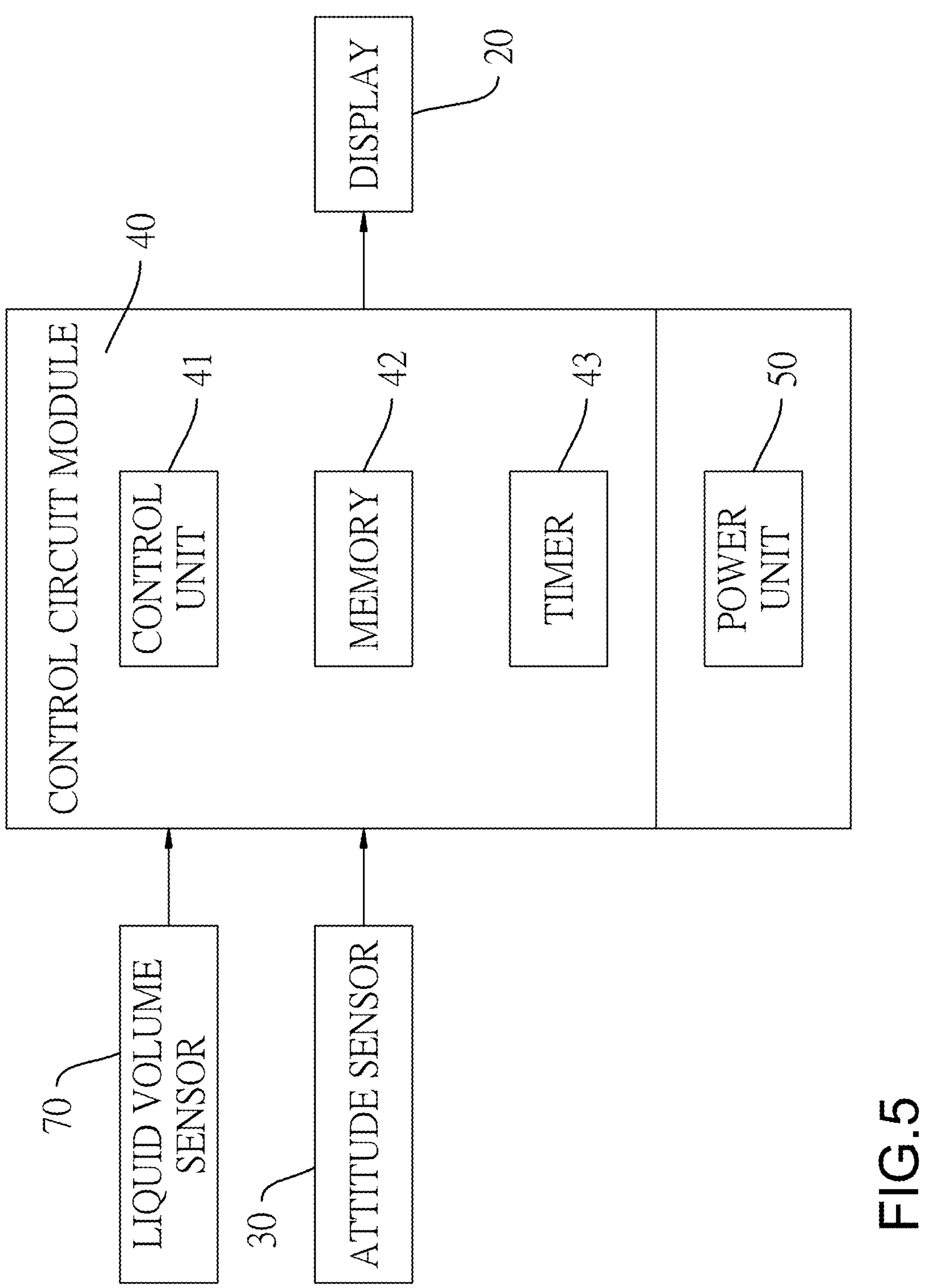
FIG. 5 is a circuit block diagram of another embodiment of the container capable of displaying information of the present invention.

The foregoing embodiments describe the initial value is a preset value, and the following embodiments will describe the initial value as a measured value. Referring to FIG. 5: the present invention may further include a liquid volume sensor 70 for measuring a current volume of liquid contained in the container body 10. The control circuit module 40 is signally connected to the liquid volume sensor 70 to receive a measurement value therefrom, wherein the initial value may correspond to the measurement value of the liquid volume sensor 70. The term "signally connected connection structure" refers to a connection structure, such as a wired connection or a wireless connection, in which the control circuit module 40 can receive the measurement value output from the liquid volume sensor 70.

1-1. A First Embodiment in which the Initial Value is the Measured Value

Figure 6:
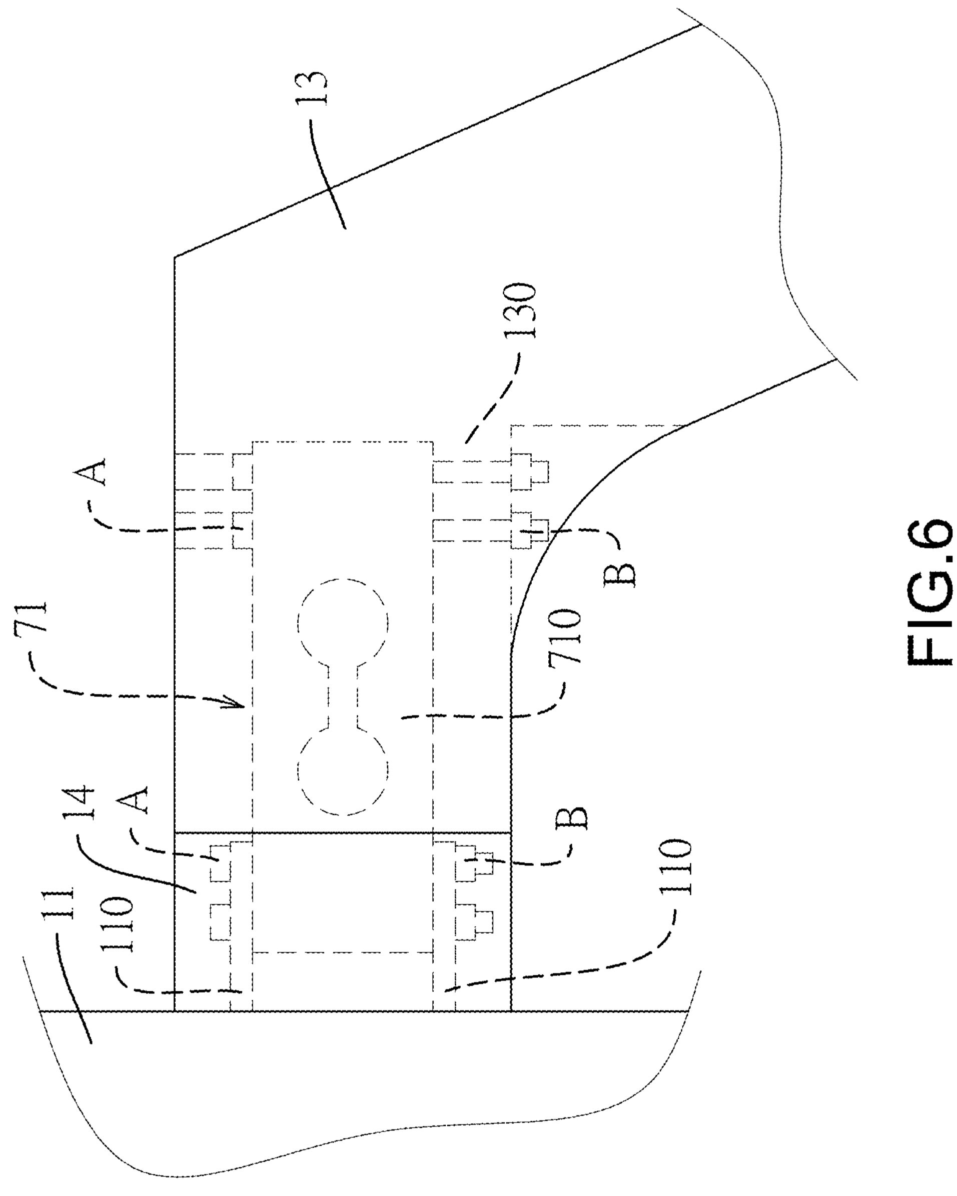
FIG. 6 is a side plane enlarged view of an embodiment of the container capable of displaying information of the present invention.

Referring to FIGS. 5 and 6: the liquid volume sensor 70 may be a load cell 71. The load cell 71 may also be called a weight sensor. The load cell 71 is mounted in the grip portion 13 and connected to the body portion 11. That is, the load cell 71 is connected between the body portion 11 and the grip portion 13 and serves as a support member between the body portion 11 and the grip portion 13. As shown in FIG. 6, the ring 14 is only placed on one end of the grip portion 13 as shown in FIG. 6, without providing substantial support.

The load cell 71 may be a product on the market, and the types of the load cell 71 include optoelectronic, hydraulic, electromagnetic, capacitive, magneto-elastic, vibratory, gyroscopic, and strain-gauge. The present invention is based on the strain-gauge shear beam load cell as an example, but is not limited thereto. With reference to FIG. 6: it is also understood that a main body 710 of the load cell 71 may be a metal block (e.g., an aluminum block) or alloy steel block, and thus the load cell 71 may serve as the support member for the body portion 11 and the grip portion 13. The combination and fixing structure among the load cell 71, the body portion 11, and the grip portion 13 is described as follows. The main body 710 of the load cell 71 has two opposite ends and each end has screw holes. In accordance with the positions of the screw holes of said one end of the load cell 71, the body portion 11 has a positioning portion 110 (such as plates) laterally extending from a side wall of the body portion 11. Similarly, the grip portion 13 can also have a positioning portion 130 in accordance with the positions of the screw holes of said the other end of the load cell 71. Screws A are screwed into the load cell 71 through the positioning portions 110, 130 respectively, and then the screws A are fastened with nuts B respectively, to achieve the foregoing combination and fixing structure.

The working principle of the load cell 71 is common knowledge in related technical fields. In short, when a user holds the grip portion 13 and lifts up the container of the present invention, an overall weight of the body portion 11 and the liquid therein will exert on the main body 710 of the load cell 71, and the main body 710 of the load cell 71 undergoes elastic body deformation. An output voltage of the load cell 71 varies according to the amount of deformation of the main body 710. It is understandable that the output voltage of the load cell 71 through an analog-to-digital conversion may correspond to a measurement value including a net weight of the body portion 11 itself and a weight (or volume) of the liquid within the body portion 11. When the body portion 11 contains more liquid volume, the deformation amount of the main body 710 is greater, and thus the measurement value of the load cell 71 is higher.

In addition, in a state where the body portion 11 is not been filled with liquid and is empty, when a user holds the grip portion 13 and lifts up the container of the present invention, the measurement value of the load cell 71 may correspond to a net weight value of the container, and then the net weight value of the container may be preset in the memory 42.

When the container of the present invention is being used, the control unit can determine whether a user has just lifted up the container of the present invention, and if so, the control unit 41 subtracts the foregoing net weight value of the container from the measurement value currently obtained from the load cell 71 to obtain the initial value equal to the current volume of liquid contained in the body portion 11 (assuming liquid water density is 1 gram per cubic centimeter). In contrast, when the user does not lift up the container of the present invention, the control unit 41 does not compute the initial value.

1-2. A Second Embodiment in which the Initial Value is the Measured Value

Figure 7:
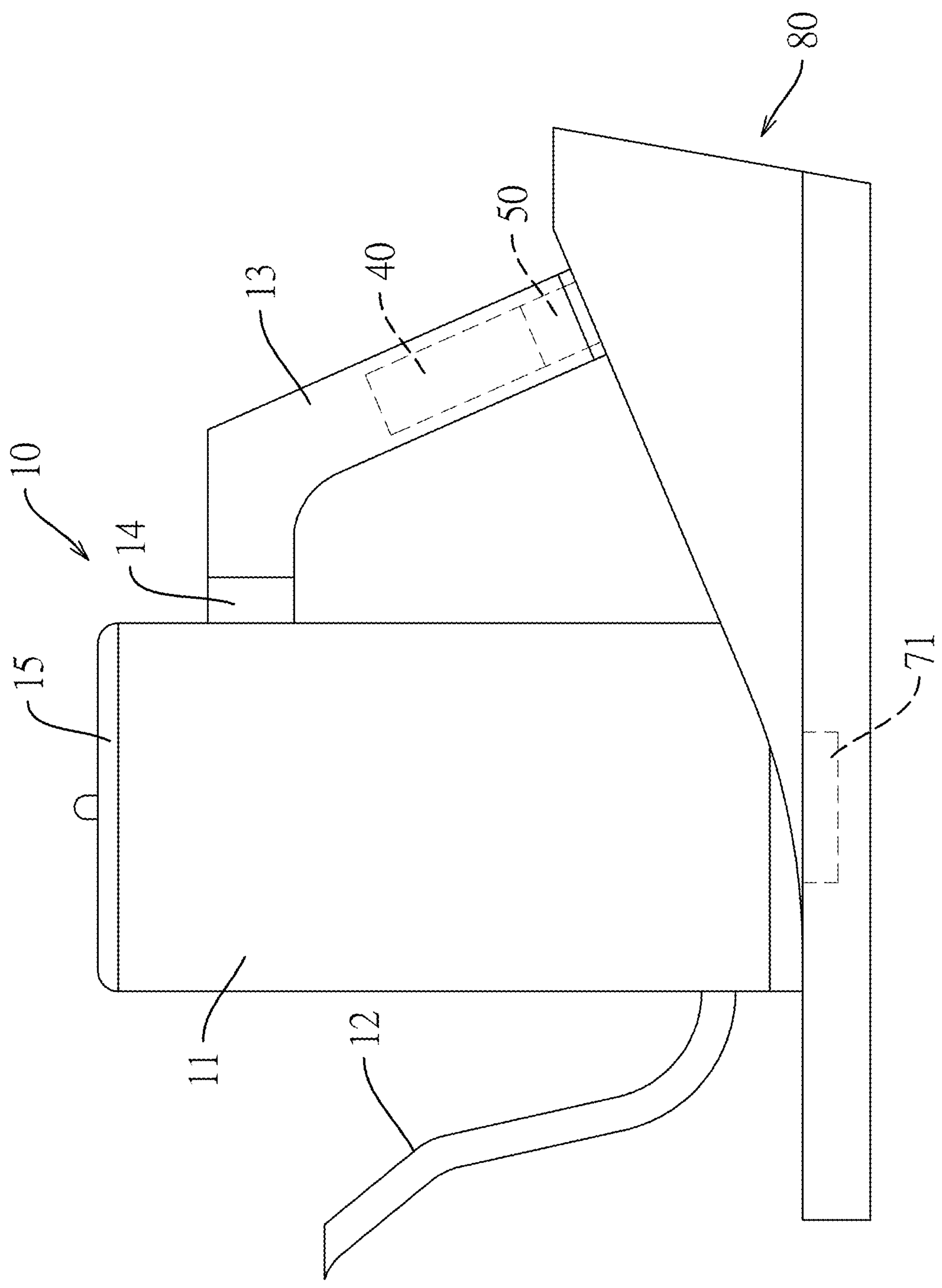
FIG. 7 is a schematic view of the container capable of displaying information of the present invention placed on a base.

In the second embodiment of the liquid volume sensor 70, referring to FIG. 7: the load cell 71 may be mounted on a top side of a base 80. The base 80 may be a seat with temperature control function. The grip portion 13 of the container body 10 is directly connected and fixed to the body portion 11. The container of the present invention is placed on the base 80. That is, the load cell in this embodiment does not serve as the support member between the body portion 11 and the grip portion 13, but is combined to the base 80, so that the base 80 has the function of weighing. When the container of the present invention is placed on the base 80, the overall weight of the container of the present invention and the liquid contained therein will exert on the load cell 71, and the control circuit module 40 and the load cell 71 can be signally connected to each other through a wireless communication module, so that the control circuit module 40 can receive measurement information from the load cell 71.

On the other hand, in a state where the body portion 11 is not been filled with liquid and is empty, when the container of the present invention is placed on the base 80, the measurement value of the load cell 71 can correspond to the net weight value of the container, and then the net weight value of the container may be preset in the memory 42.

When the container of the present invention is being used, the control unit 41 can determine whether a user has just lifted up the container of the present invention, and if so, the control unit 41 subtracts the foregoing net weight value of the container from the measurement value currently obtained from the load cell 71 to obtain the initial value equal to the current volume of liquid contained in the body portion 11. In contrast, if the user does not lift up the container of the present invention, the control unit 41 does not compute the initial value.

1-3. A Third Embodiment in which the Initial Value is the Measured Value

Figure 8:
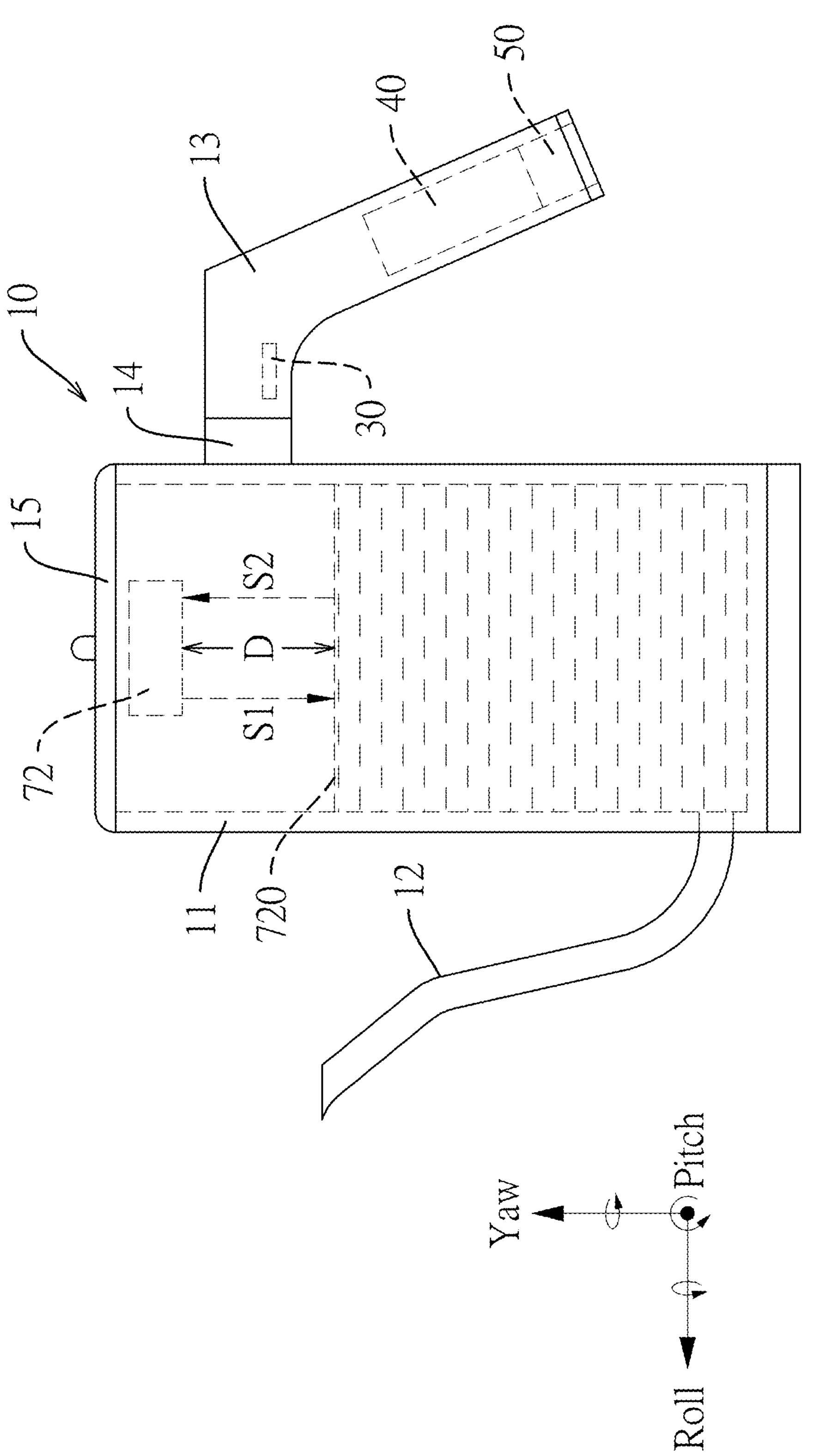
FIG. 8 is a schematic view of measuring a liquid level of the container capable of displaying information of the present invention by using a liquid-level sensor.

Please refer to FIGS. 5 and 8: the liquid volume sensor 70 can be a liquid-level gauge 72. The liquid-level gauge 72 is mounted on a top side inside the body portion 11. The liquid-level gauge 72 can be an ultrasonic liquid-level gauge, a radar liquid-level gauge, or an optical liquid-level gauge, but is not limited thereto. The working principle of the liquid-level gauge 72 is common knowledge in related technical fields. In short, the liquid-level gauge 72 can output a transmitted signal S1 to the liquid surface 720 in the body portion 11, and the transmitted signal S1 is reflected by the liquid surface 720. As a result, the liquid-level gauge 72 can correspondingly receive a reflected signal S2. Through related computation for the transmitted signal S1 and the reflected signal S2, a relative distance D between the liquid-level gauge 72 and the liquid surface 720 can be obtained, and the relative distance D is related to the volume of liquid contained in the body portion 11. When the relative distance D is longer, the liquid volume in the body portion 11 is less. In contrast, when the relative distance D is shorter, the liquid volume contained in the body portion 11 is larger. Therefore, when the container of the present invention is being used, the control unit 41 can determine whether a user has just lifted up the container of the present invention, and if so, the control unit 41 can correlate the measured value of the relative distance D of the liquid-level gauge 72 to the initial value.

The control unit 41 can determine whether a user has just lifted up the container of the present invention. In one embodiment, when the control unit 41 determines that the angle values of the attitude sensor 30 on the three sensing axes Pitch, Roll, and Yaw are 0 degree respectively, it means that the container of the present invention is placed horizontally, and the container of the present invention is not lifted up by the user. In addition, when the control unit 41 determines that at least one angle value of the attitude sensor 30 on the three sensing axes Pitch, Roll, and Yaw is not 0 degree, it means that the user has just lifted up the container of the present invention, and the computation of the initial value is started. When the user puts down the container of the present invention and keeps the container of the present invention placed in a horizontal-static state, and when the control circuit module 40 determines that a time duration of the container of the present invention being put down reaches a threshold time, for example, when the control unit 41 determines that the time duration during which the three angle values of the sensing axes Pitch, Roll, and Yaw of the attitude sensor 30 are respectively 0 degree reaches the threshold time, the control unit 41 resets the initial value to zero. The threshold time is a preset value, such as 1.5 seconds.

Figure 9:
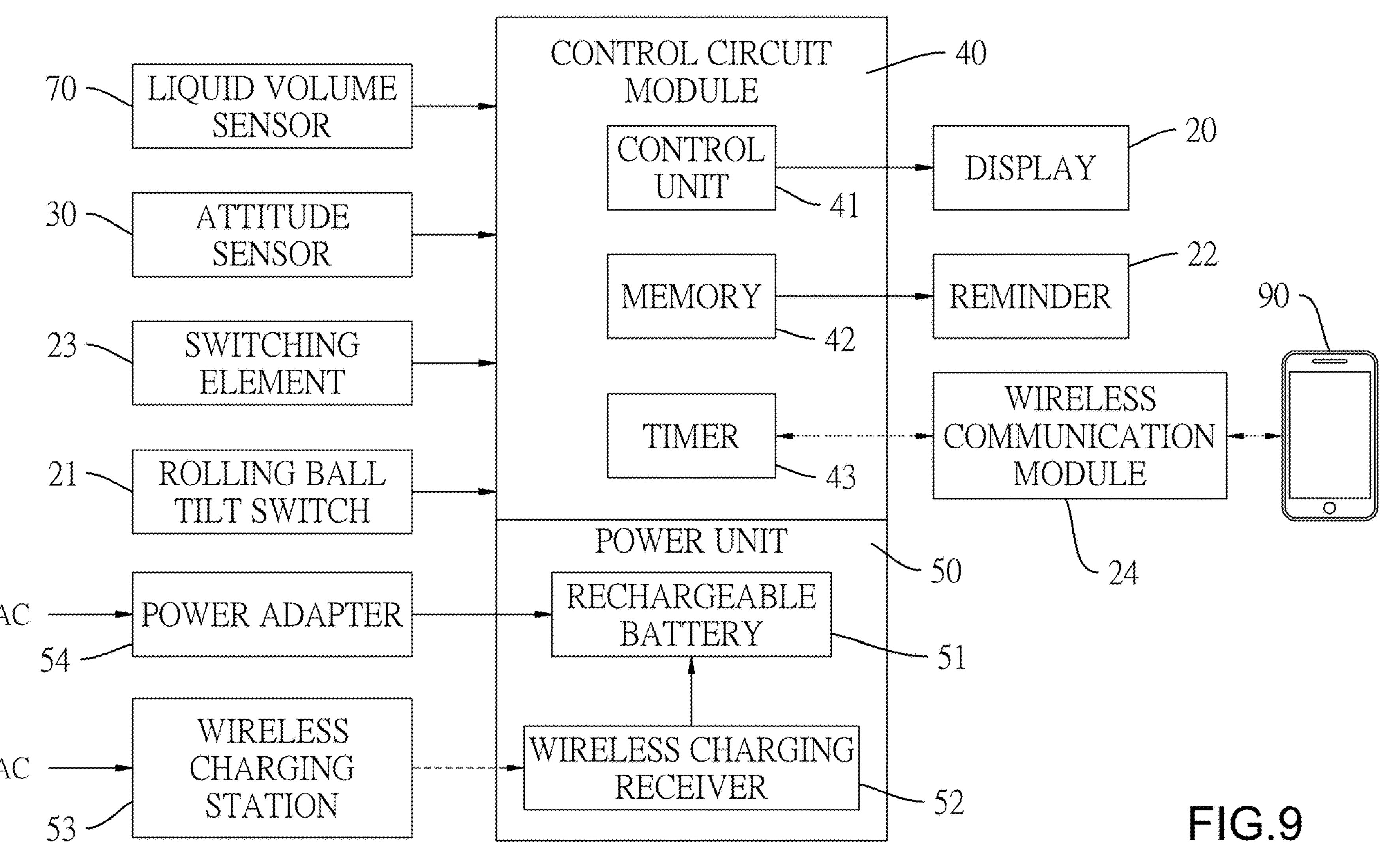
FIG. 9 is a circuit block diagram of the other embodiment of the container capable of displaying information of the present invention.

In another embodiment, please refer to FIG. 9: the control circuit module can be signally connected to a ball tilt switch 21 as a tilt sensor. The ball tilt switch 21 can be mounted on the grip portion 13 or the body portion 11. It is understandable that a short-circuit state (ON) and an open-circuit state (OFF) of the ball tilt switch 21 can correspond to the attitude of the ball tilt switch 21 respectively. For example, when the ball tilt switch 21 is lying flat, the ball tilt switch 21 may be in the open-circuit state (OFF). When the ball tilt switch 21 is tilted at a specific angle, the ball tilt switch 21 is in the short-circuit state (ON). Therefore, when the user just lifts up the container of the present invention and tilts it at the specific angle, the control unit 41 can determine a change of the states of the ball tilt switch 21, and then the control unit 41 starts to compute or reset the initial value.

Please refer to FIG. 9: the control circuit module 40 can be signally connected to an indicator 22. The indicator 22 can be, for example, an indicator light or a speaker, and can alert a user by light or sounds. The indicator 22 can be mounted on the container body 10, for example, on the body portion 11 or the grip portion 13. The control circuit module 40 can be signally connected to a switch component 23. For example, the switch component may be a touch switch, a button switch, or a micro switch to trigger the control unit 41 to perform specific functions.

Taking the scenario where the container of the present invention is used for dripping and brewing coffee as an example, factors that affect the tastes of hand-drip coffee may include flushing angle. Based on the measurement information of the attitude sensor 30, the control unit 41 can determine whether an angle value of each sensing axis (Pitch, Roll, Yaw) is greater than a corresponding threshold value, if so, the control unit 41 can drive the indicator 22 to alert the user that the flushing angle is inappropriate, wherein each threshold value for the sensing axes Pitch, Roll, Yaw is a preset value. On the other hand, the factors that affect the tastes of hand-drip coffee can also include brewing time. The switch component 23 can be used to trigger the timer function of the control unit 41. If the control unit 41 determines that the switch component 23 is pressed down, the control unit 41 can start to count time and drive the display 20 to show an elapsed time counted by the timer function, for the user to effectively keep track of the brewing time.

On the other hand, the control unit 41 can store at least one liquid flow threshold, determine which of the cumulative liquid-discharge volume and the at least one liquid flow threshold is larger, and drive an alert mode of the indicator 22 according to the determination result. For example, the at least one liquid flow threshold may include 100 ml and 150 ml. When the control unit 41 determines that the cumulative liquid-discharge volume is greater than 100 ml and less than 150 ml, the indicator 22 can be controlled to emit an alert sound such as "beep". When the control unit 41 determines that the cumulative liquid-discharge volume is greater than 150 ml, the indicator 22 can be controlled to emit two consecutive beeps such as "beep-beep". Hence the present invention can assist the user by alerting the user about the flushing volume by sounds.

In summary, the display 20 can show auxiliary guidance information, such as the discharge volume, brewing time, and battery level when pouring out liquid. In addition, the container of the present invention has merits of high precision, rapid response, and stability by the computation of the control unit 41. Taking the scenario of brewing hand-drip coffee as an example, the present invention can help a user control the water pour-out volume, flow rate, and flushing angle more conveniently, rather than relying solely on the user's subjective personal experience, so as to improve the quality and tastes of hand-drip coffee. The present invention also has the characteristics of simple-operation and ease-of-use, and thus the container of the present invention is very suitable for use in households, coffee shops and other places.

Please refer to FIG. 9: the power unit 50 may include a rechargeable battery 51. The rechargeable battery 51 is electrically connected to the control circuit module 40 to supply a working power. The rechargeable battery 51 could be charged by at least one of wireless charging and wired charging.

Figure 10:
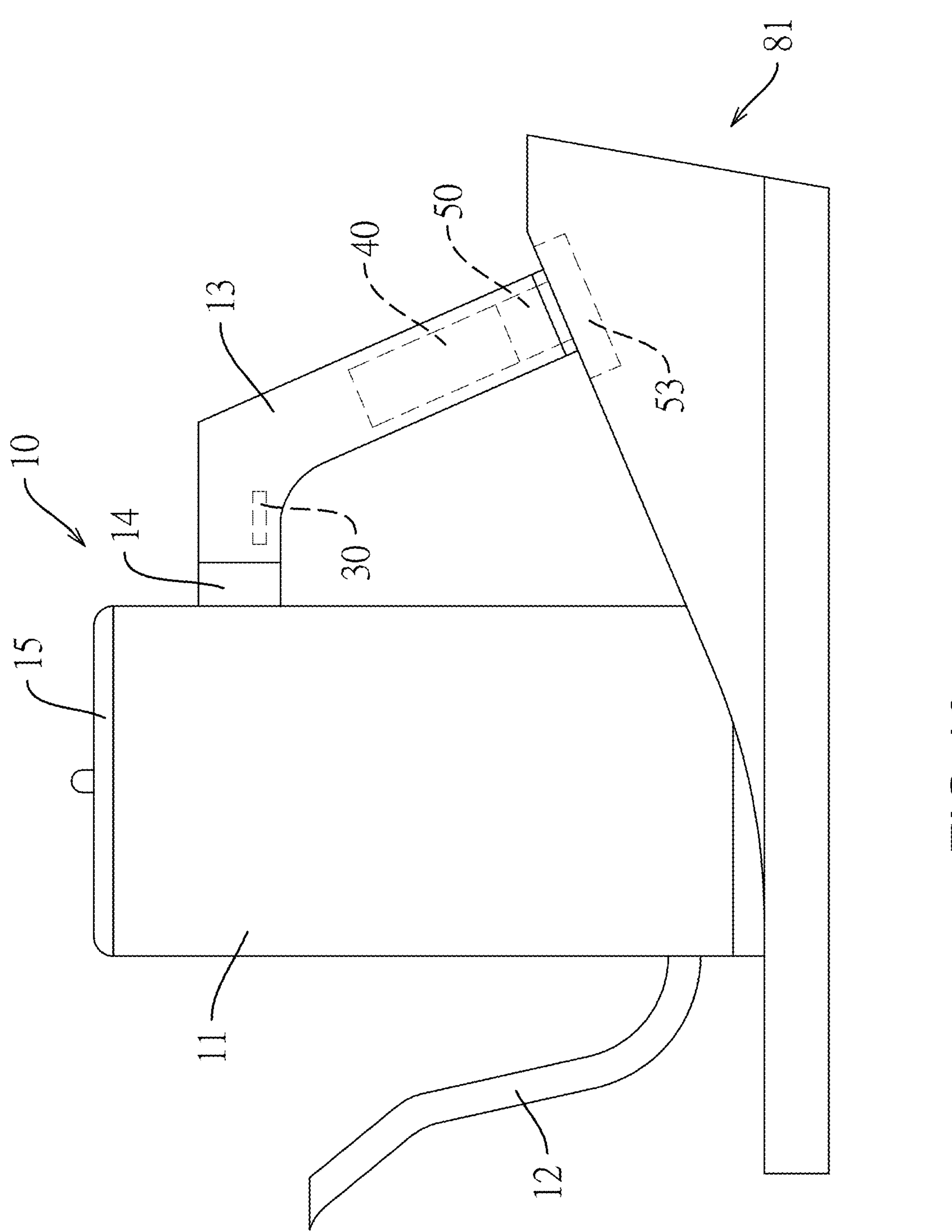
FIG. 10 is a schematic view of the container capable of displaying information of the present invention placed on a base.

For the wireless charging, the power unit 50 can include a wireless charging receiver 52, which is electrically connected to the rechargeable battery 51. Correspondingly, please refer to FIG. 10: the container of the present invention can be placed on a base 80 with a wireless charging station 53. When the container of the present invention is placed on the base 81, the position of the wireless charging station 53 corresponds to the position of a coil of the wireless charging receiver 52, so that the coil of the wireless charging receiver 52 can inductively receive and convert an output magnetic field from the wireless charging station 53 to a charging power to charge the rechargeable battery 51. For the wired charging, please refer to FIG. 9: the power unit 50 can be electrically connected to a power adapter 54 through a substantial charge cable or a connector. The power adapter 54 is used to convert an AC power from an electrical grid into a charging power to charge the rechargeable battery 51. The special characteristics of wireless charging is that the container of the present invention can be charged directly as long as it is placed on the base 80, which further improves usage conveniences.

Referring to FIG. 9: the control circuit module 40 can be signally connected to an electronic device 90. For example, the control circuit module 40 can establish a connection with the electronic device 90 through a wireless communication module 24 for data transmission. The wireless communication module 24 can be, for example, a Wi-Fi circuit module or a Bluetooth circuit module. The electronic device 90 can be, for example, a user's smart phone or a tablet computer. In this way, the control circuit module 40 can transmit the cumulative liquid-discharge volume, the elapsed time counted by the timer function, and other related data to the electronic device 90, and the electronic device 90 can also store such data as historical records, so as to facilitate the user to keep track of the coffee brewing status through the electronic device 90.

In the present invention, the control unit 41 can also rotate images shown on the display 20 according to the measurement value of the attitude sensor 30 (i.e. an angular velocity measurement value with a positive or a negative sign), wherein the control unit 41 can control an image shown on the display 20 to be a first image or a second image, and the contents of the display information of the first image and the second image are the same whereas the directions of the first image and the second image are different. The control unit 41 can control a direction of an image shown on the display 20 according to an image rotation control command. For example, please refer to a first image 201 shown on the display 20 in FIG. 11, the first image 201 corresponds to the user's view when the user holds the grip portion 13 by his/her right hand R. Please also refer to a second image 202 shown on the display 20 shown in FIG. 12: the second image 202 corresponds to the user's view when the user holds the grip portion 13 by his/her left hand L. Both the first image 201 and the second image 202 show information content "070 cc". The second image 202 is a 180-degree horizontal rotation of the first image 201, ensuring that regardless the user holds the grip portion 13 by his/her right hand R or left hand L, the user can always see the information of the image conforming to the direction of his/her view.

The following describes how the control unit 41 rotates the image shown on the display 20 according to an angular velocity measurement value of the attitude sensor 30. As mentioned above, the control unit 41 can obtain an angular velocity measurement value corresponding to the second sensing axis (Roll) through the attitude sensor 30, wherein the angular velocity measurement value with a positive sign means that the angular velocity measurement value is greater than 0, and the angular velocity measurement value with a negative sign means that the angular velocity measurement value is less than 0. It is understandable that, referring to FIG. 13: the positive sign or the negative sign of the foregoing angular velocity measurement value can correspond to a counterclockwise rotation direction or a clockwise rotation direction of the body portion 11 around the second sensing axis (Roll).

Figure 11:
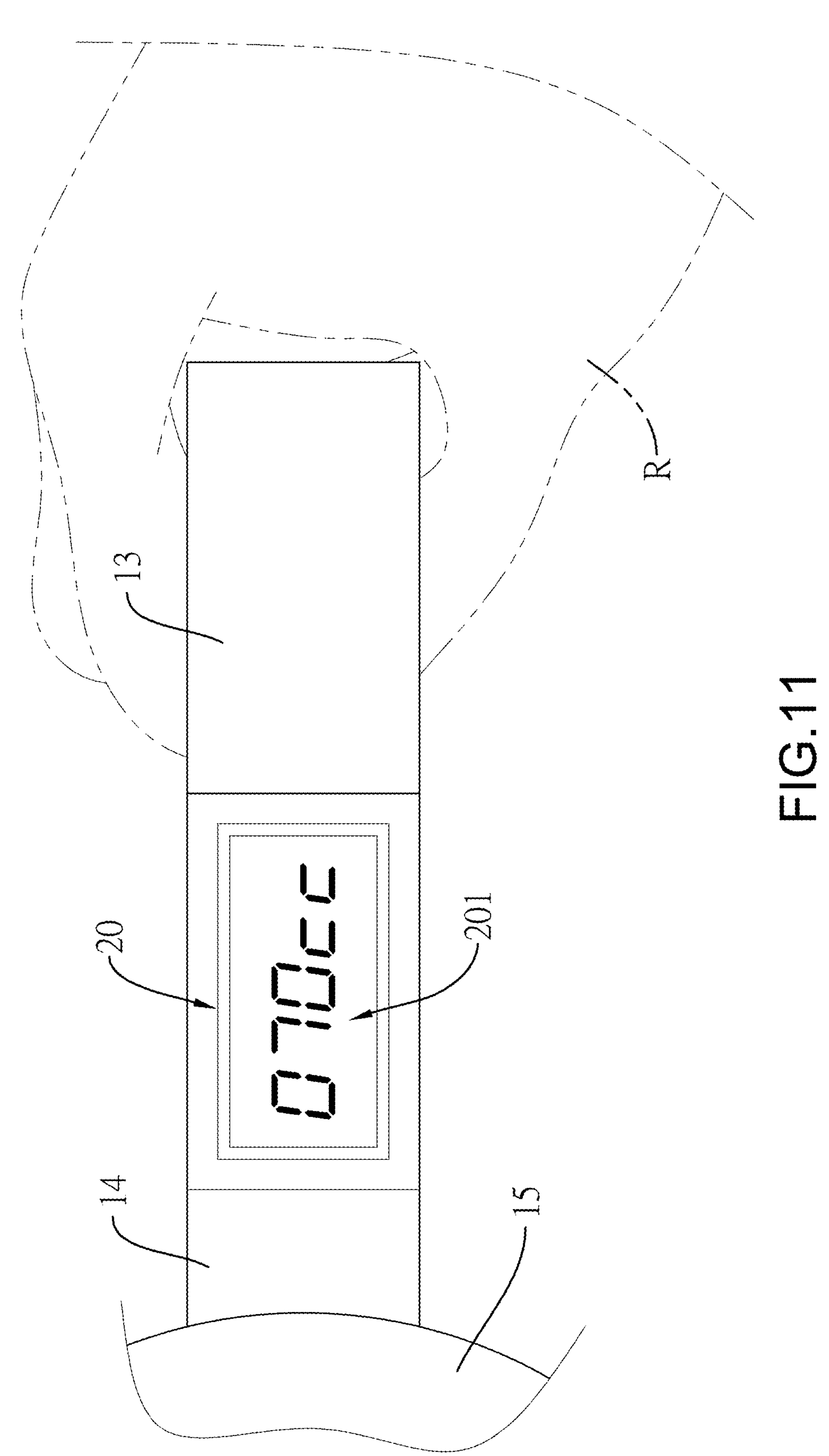
FIG. 11 is a schematic view of a user holding a grip portion of the container of the present invention in his/her right hand and a display showing a first image.
Figure 12:
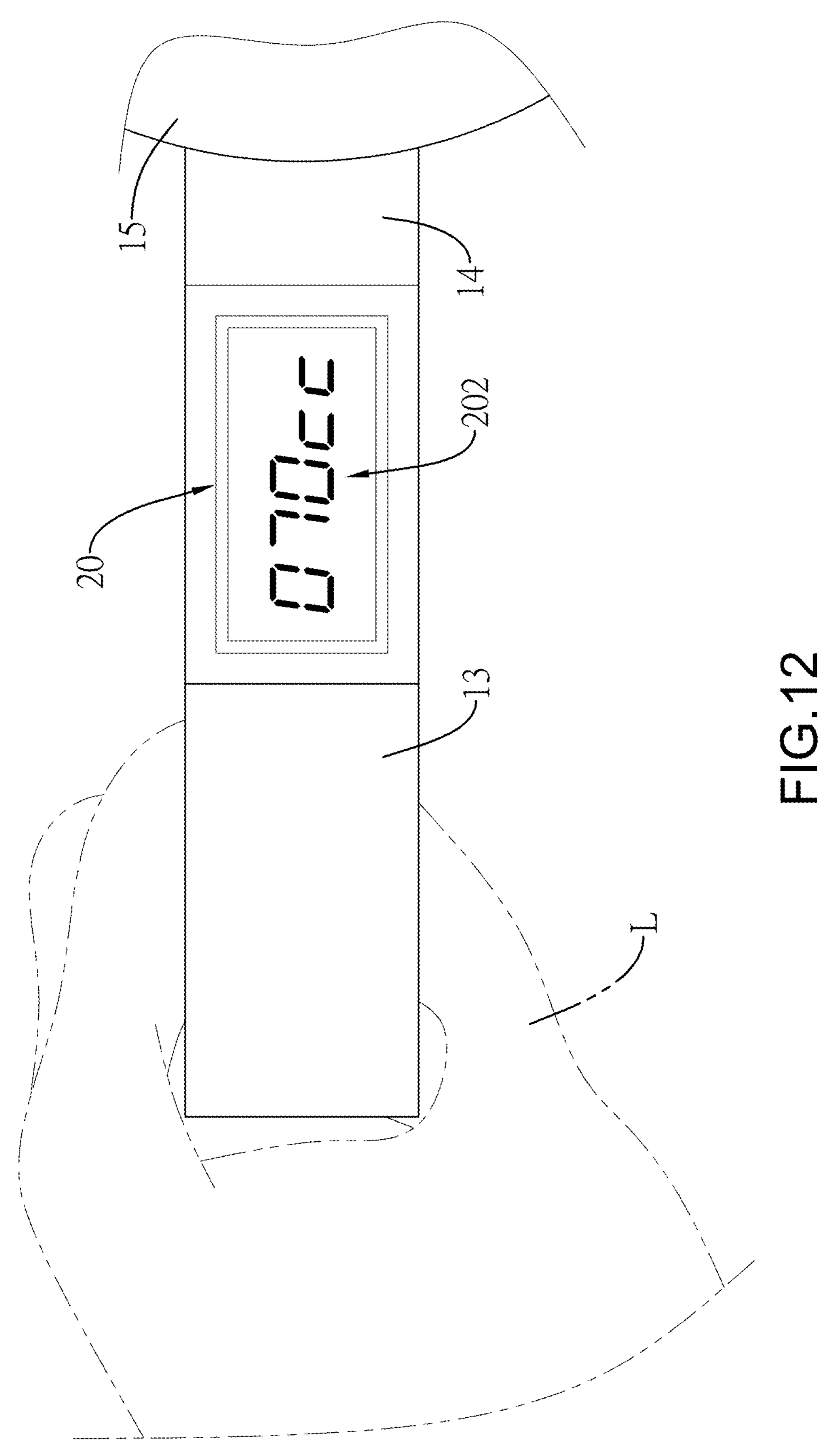
FIG. 12 is a schematic view of a user holding the grip portion of the container of the present invention in his/her left hand and the display showing a second image, wherein the second image is a 180-degree horizontal rotation of the first image.
Figure 13:
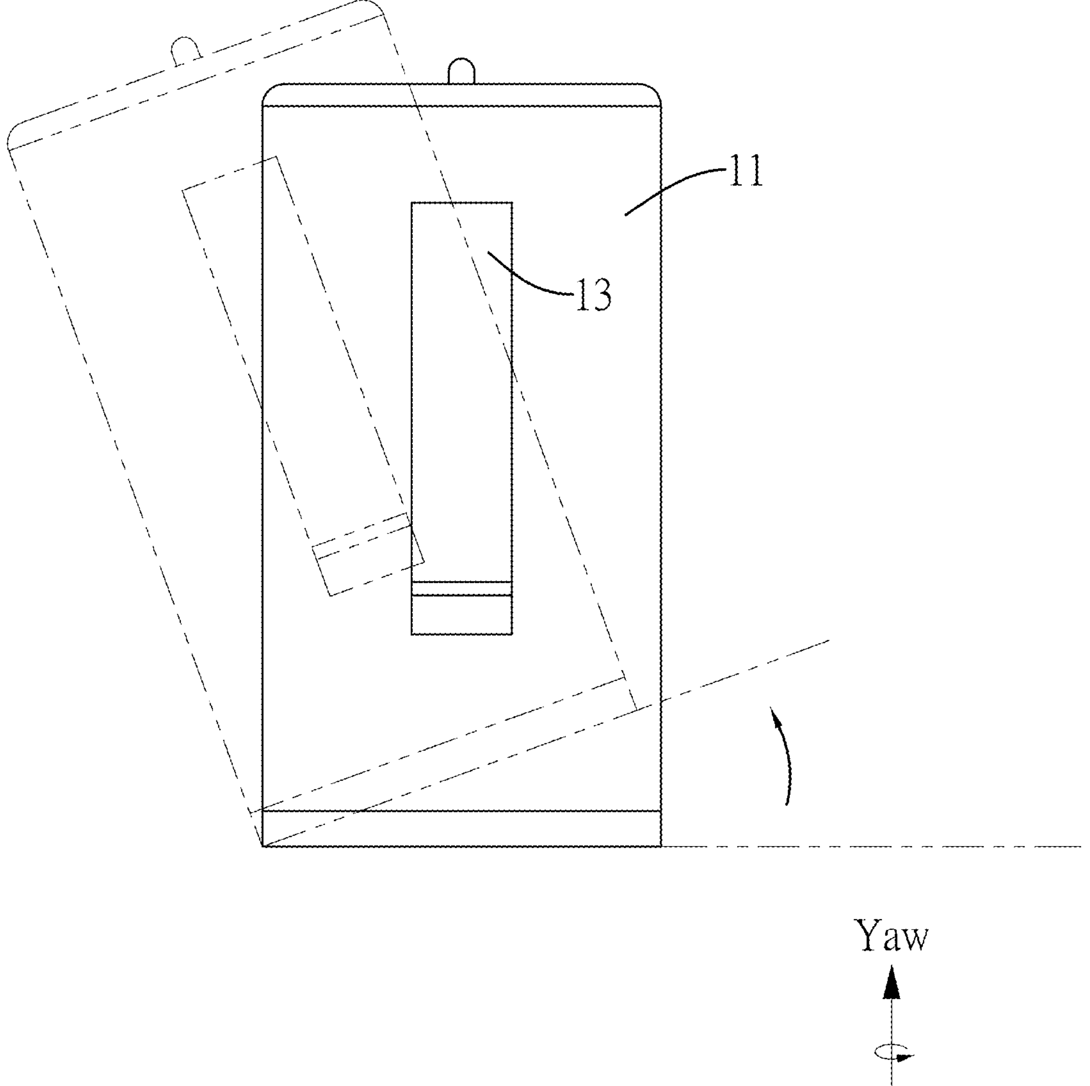
FIG. 13 is a schematic view of a counterclockwise rotation of the container capable of displaying information of the present invention around its second sensing axis (Roll).

Therefore, when the user holds the grip portion 13 by his/her right hand R as shown in FIG. 11 and rotates the body portion 11 counterclockwise around the second sensing axis (Roll) as shown in FIG. 13, the control unit 41 can control the display 20 to show the first image 201 as shown in FIG. 11 based on the positive sign of the current angular velocity measurement value. Similarly, when the user holds the grip portion 13 by his/her left hand L as shown in FIG. and rotates the body portion 11 clockwise around the second sensing axis (Roll), the control unit 41 can control the display 20 to show the second image 202 as shown in FIG. 12 based on the negative sign of the current angular velocity measurement value.

The technical principles of the present invention are described above in connection with specific embodiments. These descriptions are only intended to explain the principles of the present invention, and are not to be construed in any way as a limitation on the scope of protection of the present invention. Based on the explanations herein, other specific embodiments of the present invention can be associated by those skilled in the art without creative labor, and these equivalent variations or substitutions are included in the scope limited by the claims of this application.

Although the present invention has been disclosed as above by way of a preferred embodiment, it is not intended to limit the present invention, and any one skilled in the art may make certain changes and modifications without departing from the spirit and scope of the present invention, and therefore the scope of protection of the present invention shall be subject to the scope of the appended patent claims as defined herein.

What is claimed is:

1. A container capable of displaying information, including:

a container body, including a grip portion and a body portion;

a display, mounted on the container body;

an attitude sensor, mounted in the container body; and a control circuit module, mounted in the container body and signally connected to the display and the attitude sensor;

a liquid volume sensor, the liquid volume sensor being a load cell mounted in the grip portion and connected to the body portion; wherein the control circuit module signally connected with the liquid volume sensor to receive a measurement value therefrom, and the control circuit module uses either a look-up table or interpolation of the look-up table to compute information based on an initial value corresponding to the measurement value of the liquid volume sensor and measurement values of the attitude sensor and controls the display to show the information which is a cumulative liquid-discharge volume.

2. The container capable of displaying information as claimed in claim 1, wherein the control circuit module obtains a liquid-discharge reference value based on the initial value and the measured value of the attitude sensor by the look-up table, and obtains a first liquid-discharge volume by integrating the liquid-discharge reference value over time;

the control circuit module subtracts the first liquid-discharge volume from the initial liquid volume to obtain an immediate liquid volume;

the control circuit module obtains a plurality of the liquid-discharge reference values by the look-up table based on the continuously updated immediate liquid volume and the measured value of the attitude sensor, and obtains a plurality of second liquid-discharge volumes by integrating the plurality of liquid-discharge reference values over time respectively; and the cumulative liquid-discharge volume is a sum of the first liquid-discharge volume and the plurality of second liquid-discharge volumes.

3. The container capable of displaying information as claimed in claim 1, wherein the control circuit module obtains a liquid-discharge reference value based on the initial value and the measured value of the attitude sensor by a functional equation, and obtains a first liquid-discharge volume by integrating the liquid-discharge reference value over time;

the control circuit module subtracts the first liquid-discharge volume from the initial liquid volume to obtain an immediate liquid volume;

the control circuit module obtains a plurality of liquid-discharge reference values by the functional equation based on the continuously updated immediate liquid volume and the measured value of the attitude sensor, and obtains a plurality of second liquid-discharge volumes by integrating the plurality of liquid-discharge reference values over time respectively;

the cumulative liquid-discharge volume is a sum of the first liquid-discharge volume and the plurality of second liquid-discharge volumes.

4. The container capable of displaying information as claimed in claim 1, wherein the liquid volume sensor is a load cell mounted on a base, and the container capable of displaying information is mounted on the base.

5. The container capable of displaying information as claimed in claim 1, wherein the container body includes a body portion;

the liquid volume sensor is a liquid-level gauge mounted on a top side of the body portion and inside the body portion.

6. The container capable of displaying information as claimed in claim 1, wherein the control circuit module is signally connected to an indicator;

the control circuit module determines whether each one of the measurement values of the attitude sensor is greater than a corresponding threshold value, and when the measurement value of the attitude sensor is greater than the corresponding threshold value, the control circuit module drives the indicator to alert.

7. The container capable of displaying information as claimed in claim 1, wherein the control circuit module is electrically connected to a power unit of wired charging or wireless charging.

8. The container capable of displaying information as claimed in claim 1, wherein the control circuit module establishes a connection with an electronic device through a wireless communication module for data transmission.

9. The container capable of displaying information as claimed in claim 1, wherein the control circuit module drives the display to show an elapsed time counted by a timer.

10. The container capable of displaying information as claimed in claim 9, wherein the control circuit module is signally connected to a switch component to trigger a timer function.

11. The container capable of displaying information as claimed in claim 1, wherein the control circuit module is signally connected to an indicator, and the information computed by the control circuit module is a cumulative liquid-discharge volume;

the control circuit module determines which of the cumulative liquid-discharge volume and at least one liquid flow threshold is higher and accordingly drives the indicator to output an alert mode.

12. The container capable of displaying information as claimed in claim 1, wherein when the control circuit module determines that a time duration of the container being put down reaches a threshold time, the control circuit module resets the initial value to zero.

13. The container capable of displaying information as claimed in claim 1, wherein a control unit of the control circuit module rotates an image shown on the display based on a positive sign or a negative sign of the measurement value of the attitude sensor.

* * * * *